Nov. 17, 1931.  J. MALLINGER  1,831,919
BRAKING DEVICE FOR VEHICLES
Filed July 17, 1928  2 Sheets-Sheet 1

Inventor,
John Mallinger,
by J. Stuart Freeman,
Attorney.

Nov. 17, 1931.   J. MALLINGER   1,831,919
BRAKING DEVICE FOR VEHICLES
Filed July 17, 1928   2 Sheets-Sheet 2

Inventor,
John Mallinger,
by J. Stuart Freeman,
Attorney.

Patented Nov. 17, 1931

1,831,919

UNITED STATES PATENT OFFICE

JOHN MALLINGER, OF WOODBURY, NEW JERSEY

BRAKING DEVICE FOR VEHICLES

Application filed July 17, 1928. Serial No. 293,367.

The object of the invention is to provide improvements in braking devices for vehicles, and particularly in the multiple surface type.

Another object is to provide an annular channelled member adapted to be secured to a wheel and having substantially parallel opposed surfaces, in combination with a supporting member adapted to be fixed to the usual axle, pairs of oppositely directed friction elements, and a spider or the like mounted upon yet oscillatable with respect to said supporting member and so arranged that movement in one direction spreads the elements of each pair into binding contact with said surfaces, and movement of said spider in the opposite direction releases said elements from said surfaces.

A further object is to provide the combination of a pair of opposed surfaces, with pairs of elements having adjacent converging surfaces, and means extending between said last-named surfaces and when moved in one direction being operative to expand said elements to engage said opposed surfaces, and when moved in the opposite direction to permit the contraction of said elements free from engagement from said last-mentioned surfaces.

Figure 1:
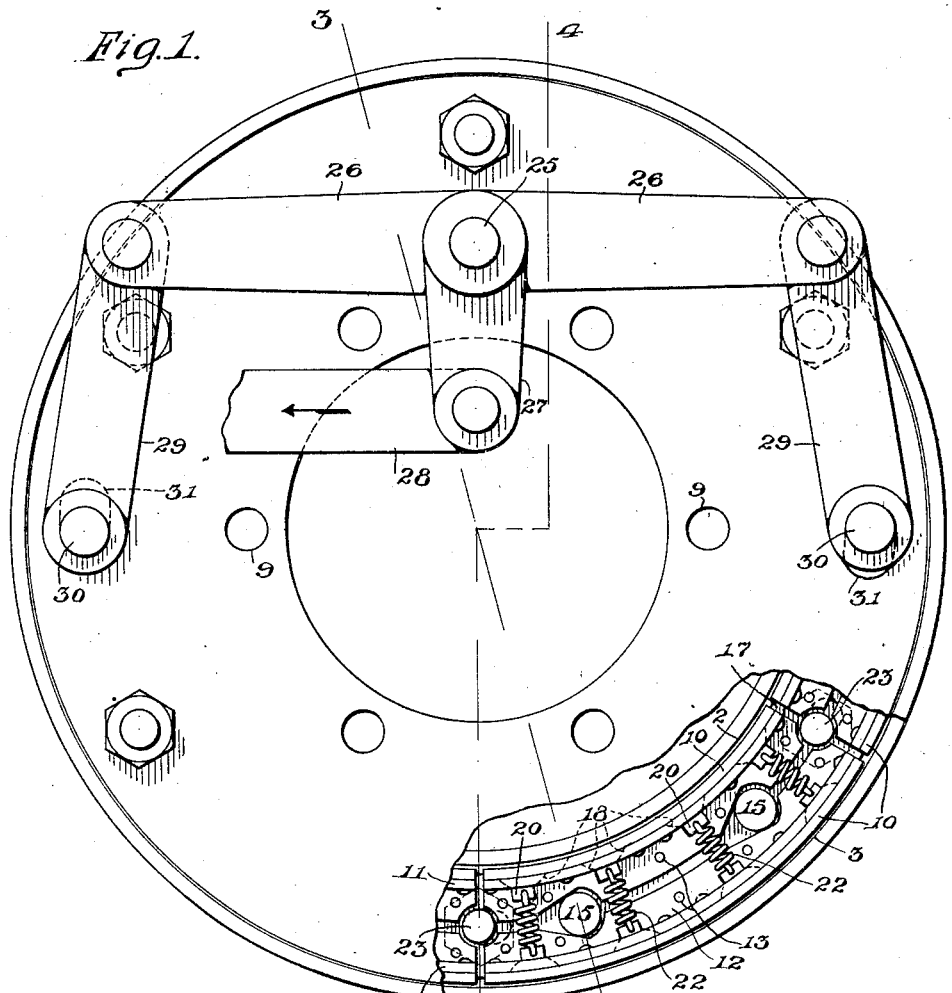
Figure 2:
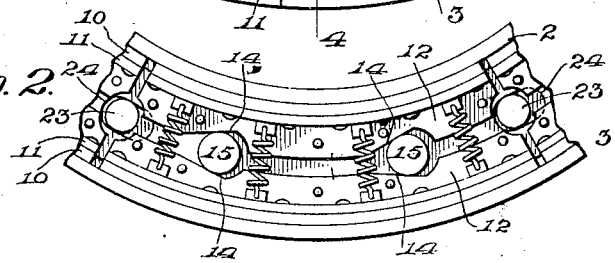
Figure 3:
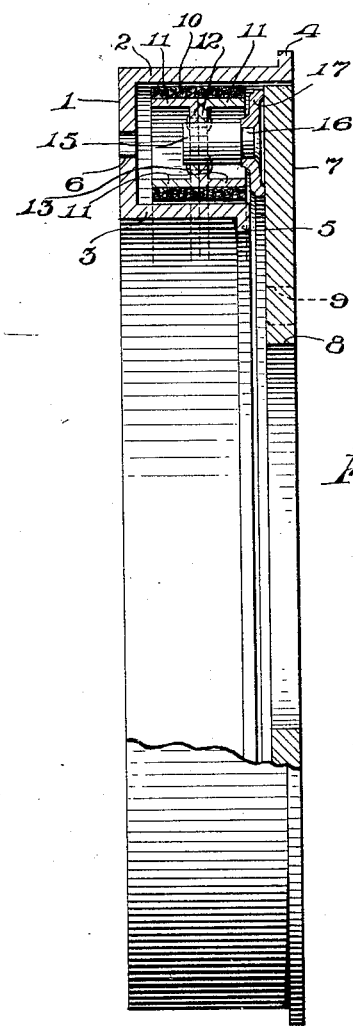
Figure 4:
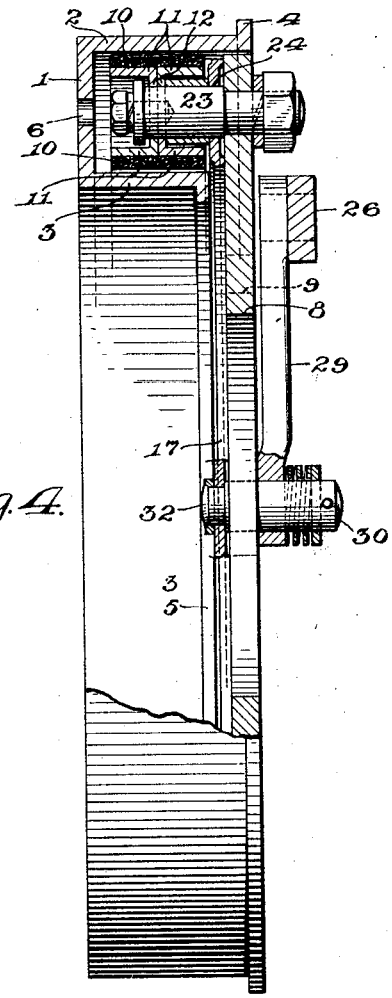
Figure 5:
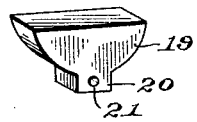

With these broad objects in mind, the invention comprises further details of construction and operation such as fully brought out in the following description, when read in conjunction with the accompanying drawings, in which Fig. 1 is an outside elevation of one embodiment of the invention partly broken away and showing the pairs of braking elements in contracted relation; Fig. 2 is a fragmentary portion of Fig. 1 showing said elements in expanded relation; Fig. 3 is a part elevation and part vertical diametrical section taken through the device on the line 3—3 of Fig. 1; Fig. 4 is a view similar to Fig. 3 but taken on the line 4—4 of Fig. 1; and Fig. 5 is a perspective view of one of the spring-supporting elements.

Referring to the drawings, an annular channelled member is shown as comprising a substantially plane base 1, from which in one direction there extend a pair of preferably parallel cylindrical flanges 2 and 3, respectively terminating in radially outwardly and inwardly extending flanges 4 and 5, and said last-named flange preferably being of less longitudinal extent than said first flange 2. This structure forms in fact a channel member, the base of which is provided with apertures 6, through which rivets, bolts, or the like may extend in order to secure said member to the spokes or other suitable portion of a vehicle wheel. On the other hand, an annular disc 7, provided with an enlarged central aperture 8 freely surrounds the usual axle or housing for the driving shaft of a vehicle and is provided with spaced apertures 9 through which bolts or the like are adapted to extend for securing said disc to such axle or housing.

Positioned between the adjacent surfaces of the channel member flanges 2 and 3 are pairs of shoes, comprising arcs of a circle and carrying suitable brake lining 10. Each shoe preferably comprises a pair of suitable angle irons 11, having parallel flanges 12, secured in any suitable manner as for instance by rivets or the like 13. These pairs of angle irons thus secured together provide a curved surface for the support of and to which is secured the brake lining 10, while the adjacent parallel flanges 12 of said angle irons are at all times spaced away from the corresponding flanges of those angle irons forming the other element of a pair of brake shoes as shown in Figs. 1 and 2. On the other hand, these opposed pairs of angle iron flanges are provided with diverging surfaces 14, between which extend pins 15, having reduced portions 16 which extend through and are rigidly secured to an annular ring or spider 17, whereby oscillation of said spider in one direction, that is so that the pins 15 move between the farthest separated portions of the diverging surfaces 14, permits the oppositely positioned pairs of angle irons and brake lining supported thereby to move towards each other in each pair, that is into the position indicated in Fig. 1.

Oscillation of the spider 17 in the opposite direction causes the pins 15 in cooperation with the converging surfaces 14 to separate said pairs of angle irons until the sections of brake lining 10 cooperate with and bind against the adjacent surfaces of the annual cylindrical flanges 2 and 3, with the result that relative movement, between said annular channelled member and the wheel to which it is secured with respect to the axle or driving shaft frame, is arrested.

Many ways of drawing the brake lining sections together upon the release of the supporting angle irons by the pins 15 are possible, but in order to illustrate one form of the invention, each of the curved flanges of the respective angle irons is suitably cut as by a milling wheel to provide circular recesses 18 which extend entirely through said curved angle iron flanges and in which are normally positioned the head portions 19 of members such as that shown in Fig. 5, each of said members being provided with an integral lug 20, having an aperture 21 through which extend one end portion of the contractible springs 22 and by which springs the oppositely positioned pairs of angle irons (in reality forming T irons) are maintained constantly in uniform cooperation with the spreader pins 15. The disc 7 is furthermore provided at circumferentially spaced intervals with studs 23 secured thereto and extending freely through enlarged apertures 24 in the spider 17. Each stud thence extends freely between the adjacent ends of neighboring pairs of brake elements as shown in Fig. 2 and said studs thereby operate to prevent said pairs of brake elements from creeping or even freely moving circumferentially with respect to said disc 7.

Pivotally mounted upon the outer side of the disc 7 at any suitable point 25 is a rocker, comprising oppositely extending arms 26 rigidly connected to a depending arm 27, from the free end of which latter extends forwardly of the vehicle the operating bar 28. From each of the oppositely positioned free end portions of the arms 26, a link 29 connects said arms to studs 30 which extend through circumferentially elongated apertures 31 in the disc 7 and at their inner reduced ends 32 are secured direct to diametrically opposite portions of said spider 17. Consequently with this construction, a forward pull upon the actuating rod 28, that is in the direction of the arrow indicated thereon, causes the rocker arms 26 to oscillate angularly so that through the medium of said link 29, the spider 17 is oscillated in a given direction (clockwise as viewed in Fig. 1) and thereby moves the pins 15 so as to separate the brake lining sections 10 and bind against the adjacent surfaces of the flanges 2 and 3. Upon releasing the tension upon the rod 28, the rocker arms oscillate in the opposite direction and permit the springs 22 to draw the oppositely directed pairs of lining sections towards each other and thereby free from engagement with said cylindrical surfaces.

Having thus described my invention, what I claim and desire to protect by Letters Patent of the United States is:—

1. A vehicle brake, comprising a pair of opposed surfaces, a pair of brake shoes positioned therebetween and having converging adjacent surfaces, and a member operative when its axis moves in a path circumferentially of and parallel with said first-mentioned surfaces between and in contact with both of said converging surfaces to expand said shoes into relatively closer proximity to said opposed surfaces.

2. A vehicle brake, comprising a pair of concentric opposed surfaces, a pair of brake shoes positioned therebetween and having converging adjacent surfaces, lining carried by each of said shoes, and a member operative when moving in one direction in a path circumferentially about the axis of said concentric surfaces between and in simultaneous contact with both of said converging surfaces to expand said shoes until said lining binds against the respective opposed surfaces.

3. A vehicle brake, comprising a pair of opposed surfaces fixed with respect to a vehicle wheel, a pair of brake shoes radially separable but circumferentially fixed with respect to a vehicle and provided with converging surfaces, and a member extending between said last-named surfaces, and operative when oscillated in one circumferential direction about the axis of said opposed surfaces to expand said shoes by simultaneous cooperation with both of said converging surfaces, into relatively closer proximity to said opposed surfaces.

4. A vehicle brake, comprising a pair of opposed surfaces fixed with respect to a vehicle wheel, a pair of brake shoes radially separable but circumferentially fixed with respect to a vehicle and provided with converging surfaces, an oscillatable member supported in fixed relation with respect to the vehicle, and a second member carried by said oscillatable member and extending between and at all times in simultaneous contact with said converging surfaces, whereby circumferential movement of said first member expands said shoes into relatively closer proximity to said opposed surfaces.

5. A vehicle brake, comprising a pair of opposed surfaces fixed with respect to two oppositely movable elements, T-irons having their heads operatively positioned with respect to said opposed surfaces, and their depending central flanges oppositely positioned and provided with converging edge surfaces, and a member extending between said edge surfaces and when moved in one circumferential direction in simultaneous contact with said surfaces being operative to expand said T-irons into relatively closer proximity to said opposed surfaces, said member being limited in motion with respect to the other of said elements.

6. A vehicle brake, comprising a pair of opposed surfaces fixed with respect to two oppositely movable elements, T-irons having their heads operatively positioned with respect to said opposed surfaces, and their depending central flanges oppositely positioned and provided with converging edge surfaces, a member carried by and movable within a limited extent with respect to the other of said elements, and a second member carried by said first member and extending between said edge surfaces, whereby transverse movement of said second member circumferentially of said opposed surfaces in simultaneous contact with said surfaces operates to further separate said T-irons and to move them into closer proximity with respect to said opposed surfaces.

7. A vehicle brake, comprising an annular channelled member having opposed surfaces and normally secured to a vehicle wheel, a pair of brake shoes mounted between said opposed surfaces and having adjacent converging surfaces, a second member fixed with respect to the vehicle and extending between said converging surfaces, and a third member oscillatably carried by said second member and when moved in one direction circumferentially of said first member cooperating with each shoe to move the other to cause said shoes to further move into proximity with said opposed surfaces.

8. A vehicle brake, comprising an annular channelled member having opposed surfaces and secured to a vehicle wheel, pairs of brake shoes mounted between said opposed surfaces and the shoes of each pair having adjacent converging surfaces, a second member fixed with respect to the vehicle, a spider circumferentially oscillatable and carried by said member, and members carried by said spider respectively and extending between and in simultaneous contact with the converging surfaces of each pair of said shoes, whereby movement of said spider in one direction cooperates with one shoe to move the other to wedge apart the shoes of each pair and move them into further proximity to said opposed surfaces.

9. A vehicle brake, comprising an annular channelled member having opposed surfaces and secured to a vehicle wheel, pairs of brake shoes mounted between said opposed surfaces and the shoes of each pair having adjacent converging surfaces, a member fixed with respect to the vehicle, a spider circumferentially oscillatable and carried by said member, pins carried by said spider respectively and extending between and in simultaneous contact with the converging surfaces of each pair of said shoes, whereby movement of said spider in one direction cooperates with one shoe to move the other to wedge apart the shoes of each pair and move them into further proximity to said opposed surfaces, and resilient means to draw the shoes of each pair towards each other and against said pins.

10. A vehicle brake, comprising a pair of opposed surfaces, a pair of brake shoes positioned therebetween and having converging adjacent surfaces, a pin extending between and in simultaneous contact with said converging surfaces and when moved in one circumferential direction being operative to wedge said shoes apart and into closer proximity to said opposed surfaces without imposing unequal pressure upon said pin radially of its support, and resilient means extending between and operative to draw said shoes towards each other and against said pin.

11. A vehicle brake, comprising a pair of opposed surfaces, a pair of brake shoes positioned therebetween and having converging adjacent surfaces, and a pin operative when moving in one circumferential direction between and in contact with said converging surfaces to move each shoe radially by cooperation with the other whereby said shoes simultaneously bind in opposite directions against said surfaces.

12. A vehicle brake, comprising a pair of opposed surfaces, a pair of brake shoes positioned therebetween and having converging adjacent surfaces, a pin operative when moving in one circumferential direction between and in contact with said converging surfaces simultaneously to expand said shoes into relatively closer proximity to said opposed surfaces, and a spring extending between said shoes and normally withholding them free from engagement with said surfaces, and maintaining said converging surfaces in contact with the opposite sides of said pin.

13. An internal expanding brake mechanism for a road vehicle wheel having a brake drum, said mechanism comprising a pair of brake shoes arranged for radial movement, springs normally under tension and tending to force the shoes radially away from said drum, and means movable about the axis of said drum in simultaneous contact with said shoes and operable to move and hold said shoes in engagement with the drum.

14. An internal expanding brake mechanism for a road vehicle wheel having a brake drum, said mechanism comprising a series of pairs of brake shoes arranged for radial movement, a spring extending between the shoes of each pair and normally tending to force the shoes radially away from said drum, and means movable about the axis of said drum and in simultaneous contact with the shoes of each pair to move and hold said shoes in engagement with the drum.

In testimony whereof I have affixed my signature.

JOHN MALLINGER.